NARROW-BAND TELEPHONY SYSTEM

Filed Feb. 24, 1955 4 Sheets-Sheet 1

INVENTORS
PIERRE C. MARCOU
JACQUES L. DAGUET
by Pennie Edmonds Morton Barrows & Taylor
ATTORNEYS

NARROW-BAND TELEPHONY SYSTEM

Filed Feb. 24, 1955 4 Sheets-Sheet 2

INVENTORS
PIERRE C. MARCOU
JACQUES L. DAGUET
by Pennie Edmonds Morton Barrows & Taylor
ATTORNEYS INVENTORS
PIERRE C. MARCOU
JACQUES L. DAGUET
by Pennie Edmonds Morton Barrows + Taylor
ATTORNEYS INVENTORS
PIERRE C. MARCOU
JACQUES L. DAGUET
by Pennie Edmonds Morton Barrows & Taylor
ATTORNEYS United States Patent Office 2,998,491

Patented Aug. 29, 1961

2,998,491

NARROW-BAND TELEPHONY SYSTEM

Pierre C. Marcou, 138 Rue du Theatre, and Jacques L. Daguet, 57 Rue de Flandre, both of Paris, France Filed Feb. 24, 1955, Ser. No. 490,374
6 Claims. (Cl. 179—15.5)

The present invention relates to a system of telephony which uses for the transmission of speech only a very narrow band of frequencies of the order of a few tens of cycles per second.

It is known that a telephonic signal may be written in the following form:

$$s(t)=a(t)\cos[\phi(t)] \qquad (1)$$

in which a $(t)$ and $\phi(t)$ represent respectively the amplitude and phase of the signal and are defined in terms of the analytic signal.

If in the signal of Equation 1 the amplitude is made constant by means of suitable electronic devices, examples of which will be described hereinafter, it may be observed that all of the information is contained in the term:

$$\cos[\phi(t)] \qquad (2)$$

In fact if the voltage represented by $\cos[\phi(t)]$ is applied to a loud-speaker, the speech will be so reconstituted as to make the words intelligible and with conservation of timbre. The amplitude being constant, the dynamic characteristic of the speech is lost but this loss is without significance to its intelligibility.

According to the invention the telephonic signal $a(t)\cos[\phi(t)]$ is first transposed into a single side band on a carrier of angular frequency $\omega$ where it takes the form:

$$a(t)\cos[\omega t+\phi(t)] \qquad (3)$$

The angular frequency $\omega$ of the carrier is chosen sufficiently high so that the bands of $a(t)$ and of $\cos[\omega t+\phi(t)]$ are widely separated and do not overlap.

The signal represented by (3) is thereupon clipped so as to make its amplitude constant, and the result is:

$$B\cos[\omega t+\phi(t)] \qquad (4)$$

in which B is a constant. The signal (4), which is a clipped single-sideband signal, occupies substantially the same band width as the original signal of Equation 1. Its instantaneous angular frequency is:

$$\omega+\frac{d\phi}{dt}$$

and knowledge of the term $$\frac{d\phi}{dt}$$

is sufficient to reconstitute the useful signal $\cos[\phi(t)]$.

It has been heretofore proposed, for example in German Patent No. 878,381, to transmit separately, either simultaneously in separate channels or successively in the same channel, the amplitude $a(t)$ of the telephonic signal and its instantaneous frequency $$\frac{d\phi}{dt}$$

The telephonic signal is first transposed in frequency to the form of a single-sideband signal. The amplitude is obtained by a linear detection of the transposed signal, and its instantaneous frequency is obtained by limiting and by frequency discrimination. However, in the prior art the amplitude and the instantaneous frequency are both transmitted, the telephonic signal being reconstituted at the receiving station by frequency modulating a local signal by the signal which represents the instantaneous frequency of the intelligence and by amplitude modulating the frequency modulated signal so obtained. Finally the resultant signal is once more transposed in frequency into the range of audio frequencies.

According to the present invention the amplitude term $a(t)$ which is unnecessary for speech intelligibility is not transmitted. Neither is the instantaneous frequency directly transmitted; instead there is transmitted a submultiple thereof.

The present invention is based on recognition of the fact that the band width necessary for transmission of the instantaneous frequency $$\frac{d\phi}{dt}$$

is much narrower than that necessary for the transmission of $\cos[\phi(t)]$. Otherwise stated, $\cos[\omega t+\phi(t)]$ represents a wave modulated in frequency by very low frequencies but with a high modulation index.

Consequently the signal (4) is subjected to division in frequency by a factor N which may be substantial, for example of the order of 100, and there is thus obtained a new resultant signal whose band width is approximately 1/100 that of the signal (4). The normal channel of 3500 cycles per second which serves for transmission of speech is thus reduced to some 30 cycles per second and may be reduced even further. The signal transmitted is of the form:

$$B\cos\frac{\omega t+\phi(t)}{N} \qquad (5)$$

This new signal is a single-sideband signal occupying a band width N times narrower than the signal (4).

The process of frequency division is subject to the limitation that one cannot reduce the band width below the value necessary to transmit the instantaneous variations in frequency. Thus it cannot be reduced below the band width of $$\frac{d\phi}{dt}$$

The signal (4) is characterized by phase discontinuities of $\pi$ corresponding to zero amplitudes of the signal $a(t)$. In order to eliminate these discontinuities the frequency of the signal (4) is according to the invention doubled, giving:

$$B\cos[\omega t+2\phi(t)] \qquad (6)$$

a signal which occupies a band width double that of the signal of Equation 1 and which has for instantaneous frequency $$2\omega+2\frac{d\phi}{dt}$$

Therefore instead of dividing the frequency of the signal (4) by N, the signal (6) is divided in frequency by 2N in order to obtain the same resultant signal (5).

The signal (5), which contains all the useful information, has a constant amplitude and may be class C amplified.

The single-sideband carrier-suppressed modulator employed may be of any desired type. Nevertheless applicants prefer to use apparatus including a first modulator with carrier suppression to modulate a carrier of angular frequency $\omega$ with the telephonic signal $s(t)$ to be transmitted. A second modulator with carrier suppression modulating a carrier of the same frequency but in quadrature with the first carrier, with a signal $\sigma(t)$ in quadrature with the signal to be transmitted throughout the range of frequencies occupied by the latter is then employed together with means for addition of the two carriers so modulated. These single-sideband modulators which do not include any filter for suppression of the unwanted sideband are of very simple construction but are subject to the disadvantage that they leave a vestige of the undesired sideband, albeit of very low amplitude, for example 40 db below the level of the desired sideband. This vestige is due to the difficulty of producing an audio signal rigorously in quadrature with a given signal over a range of frequencies 3500 cycles wide. The clipping which has been referred to produces a further reduction in the amplitude of the undesired sideband.

The invention will be described in further detail with reference to the accompanying drawings in which:

FIG. 1 is a diagram, partly schematic and partly in block form, of the transmitter of a telephone communication system according to the invention;

FIGS. 2*a* and 2*b* represent wave forms at particular points within the circuit of FIG. 1;

Figure 1:
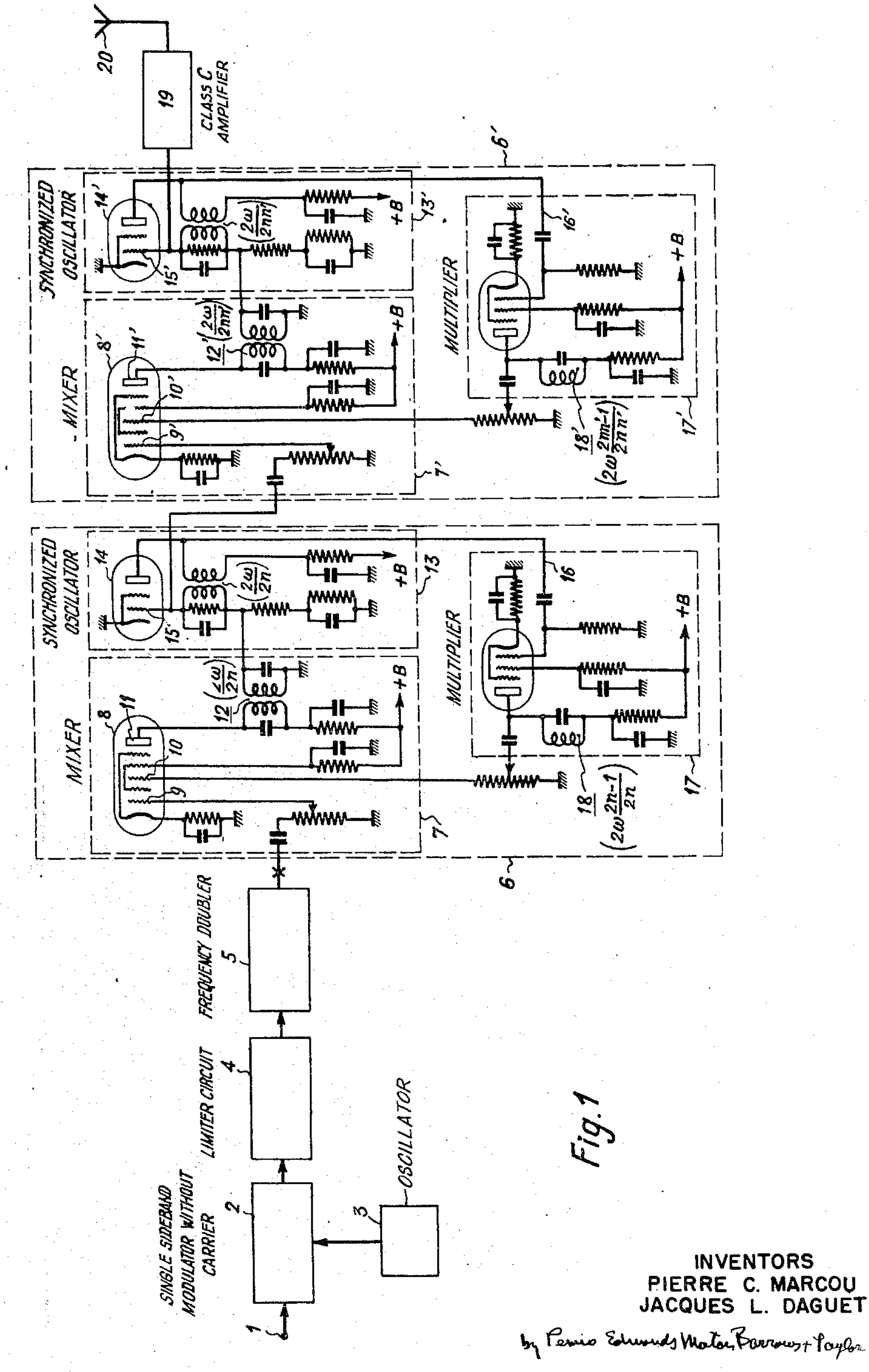

Referring to FIG. 1, 1 is the speech input terminal of the transmitter to which is applied the telephonic signal (1). In the single-sideband carrier-suppressed modulator 2 this signal modulates a carrier of angular frequency $\omega$ produced in the oscillator 3. At the output of the circuit 2 there consequently appears the signal (3) modulated in amplitude and in phase.

4 indicates the limiter circuit at whose output terminal there appears the signal (4) which is phase modulated only. As explained hereinabove, signal (4) has substantially the same width as the signal (1) but exhibits phase discontinuities of $\pi$. These discontinuities are eliminated in the frequency doubler circuit 5.

At the output of circuit 5 there is provided a frequency divider circuit 6 effecting frequency division by a factor ($2n$). The circuit 6 includes a mixer stage 7, a synchronized oscillator 13 and a multiplying stage 17.

The output of the circuit 5 is connected to the first control grid 9 of tube 8 in the mixing stage 7, and the output of the multiplying stage 17 is connected to the second grid 10 of this tube. The plate circuit 11 of tube 8 comprises a resonant circuit 12 tuned to the frequency $$\frac{2\omega}{2n}$$

which is coupled to the grid 15 of tube 14 in the synchronized oscillator 13. This synchronized oscillator has a natural frequency very close to $$\frac{2\omega}{2n}$$

The mode of operation of a synchronized oscillator is described in an article of applicant Daguet in Annales de Télécommunications, vol. 8, No. 1, January, 1953, pages 1–9.

The output of the synchronized oscillator 13 is connected on the one hand to a further circuit 6' for frequency division by a factor $n'$ and also to the input of the multiplying stage 17, via the line 16.

The multiplying stage 17 operates with a factor $2n-1$, its resonant circuit 18 being tuned to the frequency $$2\omega\frac{2n-1}{2n}$$

On the first grid of tube 10 there appears asignal of instantaneous frequency $$2\omega+2\frac{d\phi}{dt}$$

and on its second grid there appears a signal of instantaneous frequency $$\left(2\omega+2\frac{d\phi}{dt}\right)\frac{2n-1}{2n}$$

In the plate circuit of the same tube there appears a signal of angular frequency $$\frac{2\omega+2\frac{d\phi}{dt}}{2n}$$

which synchronizes the oscillator 13.

The circuit 6' differs from the circuit 6 only in the values of its circuit constants, which are designated by primed reference characters corresponding to those of the circuit 6. The circuit 6' effects frequency division by a factor $n'$. At the output of the synchronized oscillator 13' there appears a signal $$B\cos\frac{2\omega t+2\phi(t)}{2nn'}=B\cos\frac{\omega t+\phi(t)}{N} \quad (5)$$

(in which $N=nn'$) and having an instantaneous angular frequency $$\frac{2\omega+2\frac{d\phi}{dt}}{2nn'}=\frac{\omega+\frac{d\phi}{dt}}{N}$$

Moreover the band width of this signal is $nn'$ times narrower than that of the signal (4), (i.e. of B cos $[\omega t+\phi(t)]$, so long as $nn'$ satisfies the limiting condition set forth above.

The narrow band width signal (5) may be transmitted directly by connecting the output of the synchronized oscillator 13' to a class C power amplifier 19 connected with the communication channel itself, for example via a transmitting antenna 20 if communication is to be by wireless means. Alternatively, however, the signal (5) may be transmitted as a modulation on any conventional form of transmission. It may moreover be noted that if a carrier is to be amplitude modulated by the signal (5), a modulation index of 100% may be continuously realized in view of the constant amplitude of that signal.

In a transmitter according to the invention which has been constructed and operated by applicants, the following values were obtained $$f=\frac{\omega}{2\pi}=2 \text{ mc.}$$

After frequency doubling $$2f=\frac{2\omega}{2\pi}=4 \text{ mc.}$$

After division by $2\times100$ by means of two frequency dividing circuits in cascade, one having a factor of 20 and the other a factor of 10

$$\frac{2f}{2\times100}=\frac{2\omega}{400\pi}=20 \text{ kc.}$$

The signal of frequency $$\frac{2f}{2\times100}$$

was transmitted directly.

For a telephonic signal according to Equation 1 occupying a band width of 3500 cycles per second the band width of the transmitted signal (5) was 35 cycles per second and might have been even further reduced.

Figure 2A:
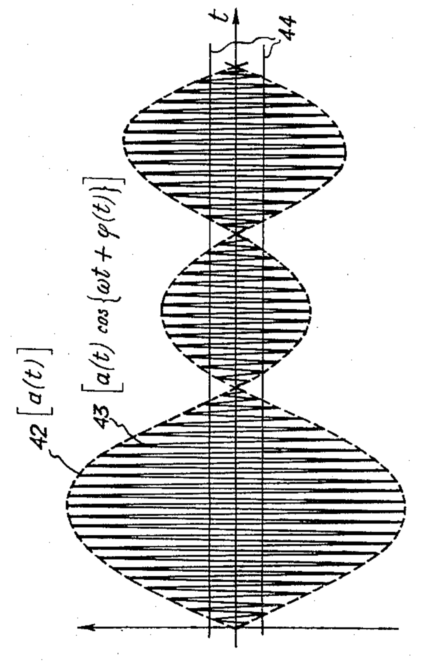

FIG. 2*a* represents the shape of the single sideband signal (3) before limiting. Curve 42 represents the function $a(t)$. Curve 43 represents the function $$a(t)\cos[\omega t+\phi(t)]$$

This is a curve of sinusoidal shape of variable amplitude and frequency.

Figure 2B:
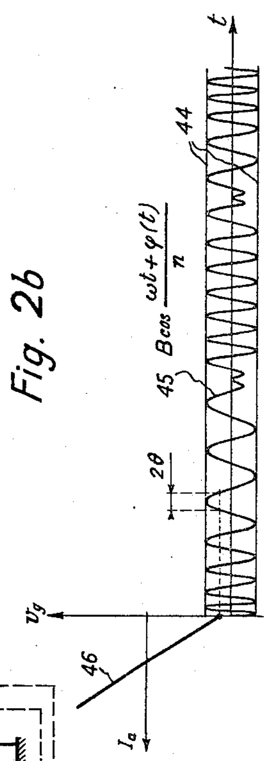

FIG. 2*b* represents the shape of the single sideband signal after limiting and frequency division. Curve 43 of FIG. 2a, divided in frequency and limited in amplitude at the level indicated by the horizontal lines 44, produces the curve 45. This is a curve of sinusoidal shape, of constant amplitude and variable frequency. The signal represented by the curve 45 is class C amplified in the amplifier 19, the straight line 46 of FIG. 2b representing the grid volt-plate current characteristic of the amplifying tube in amplifier 19. Although the signal to be amplified is not of constant frequency the aperture angle $\theta$ of this signal does not depend upon frequency and is constant except in the vicinity of the zero amplitude points. This results in the introduction of negligible distortion only since at these points the telephonic signal is very weak.

Figure 3:
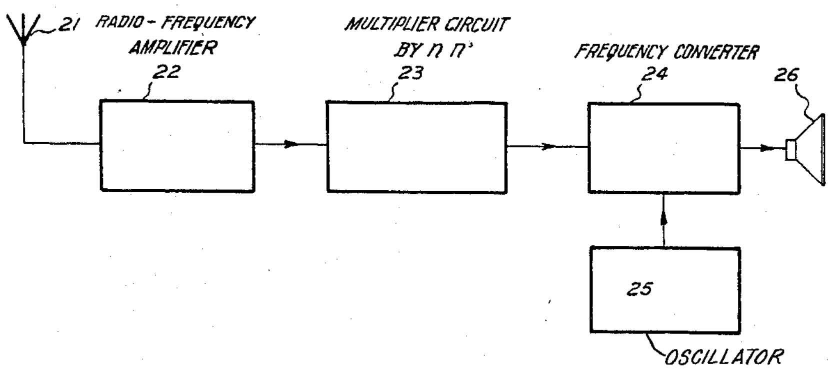
FIG. 3 is a block diagram of a receiver for use with the transmitter of FIG. 1.

The receiver of FIG. 3 includes a radio frequency amplifier 22 fed from a receiving antenna 21, a frequency multiplying circuit 23 which operates with a factor $N=nn'$, restoring the carrier to the vicinity of 2 mc., and a frequency changing circuit 24 which is fed from an oscillator 25 with a signal of the same frequency $\omega$ as that produced by the oscillator 3 at the transmitter. The output of the frequency converter is connected to a loud-speaker 26 which reconstitutes the signal $[\cos \phi(t)]$. Thus as has been indicated the speech is restored to perfect intelligibility and the timbre is also preserved although the dynamic range is not.

Figure 4:
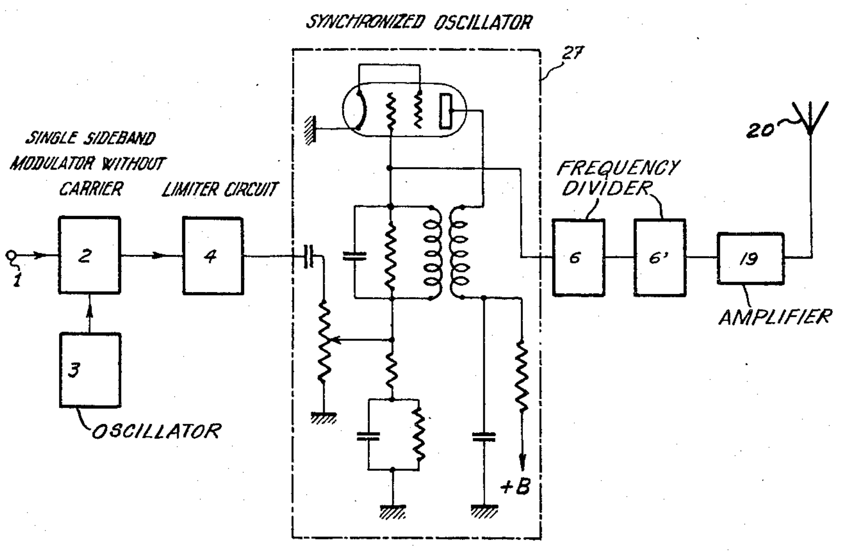
FIG. 4 shows a modification of the circuit of FIG. 1.

In the modification according to FIG. 4, the reference characters 1, 2, 3, 4, 6, 6', 19 and 20 identify the same elements as in FIG. 1. The frequency doubler circuit 5 is however omitted and the output of the limiter circuit 4 is directly connected to the input of a synchronized oscillator 27. The variations in phase of $\pi$ in the signal (4) are without influence on the signal appearing at the output of the synchronized oscillator 27. The frequency of this signal is at all times equal to that of the signal at the output of limiter circuit 4 but does not show phase discontinuities.

Figure 5:
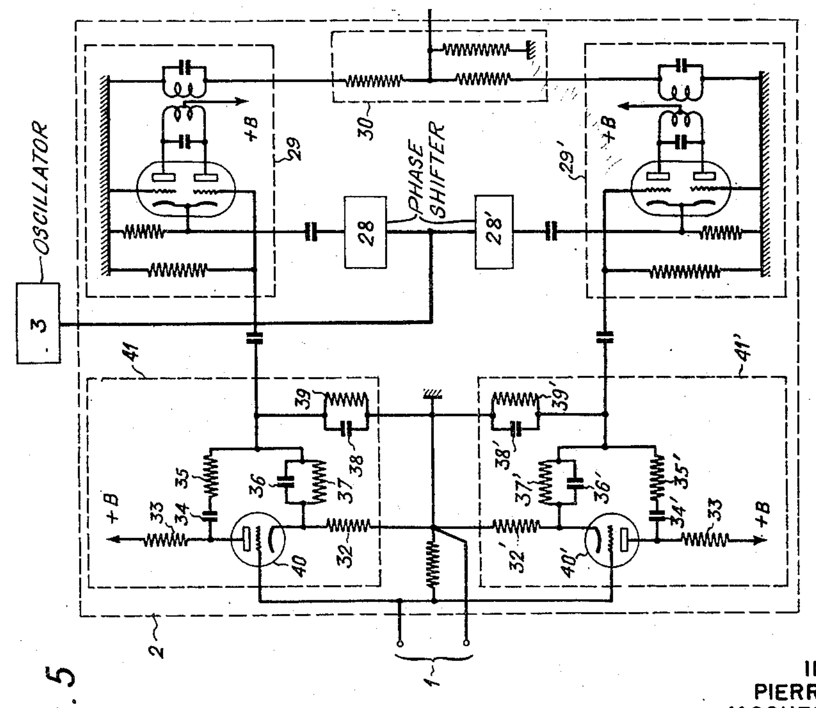
FIG. 5 is a schematic diagram of a single sideband modulator suitable for use in the transmitter of FIG. 1.

Referring now to FIG. 5 which represents the single sideband modulator 2 of FIG. 1, a modulating telephonic or voice signal is applied to the input terminals 1 and passes from these terminals to two phase shifting circuits 41 and 41' which throughout the band of frequencies occupied by the modulating signal produce phase shifts $\phi_1$ and $\phi_2$ differing by substantially 90°.

In FIG. 5, 3 is again the radio frequency oscillator as in FIG. 1. Its output is connected to two phase shifters 28 and 28' which respectively advance and retard the signal generated by the oscillator 3 through an angle of 45°. At the output of the phase shifter 28 there is accordingly available a single $E \cos \omega t$ whereas at the output of the phase shifter 28' there is available a signal $-E \sin \omega t$.

29 and 29' are two carrier suppressing modulators which produce at their outputs respectively $$Ea(t) \cos [\phi(t)] \sin \omega t$$

and $$-Ea(t) \sin [\phi(t)] \sin \omega t$$

30 is an addition circuit which produces $$Ea(t) \cos [\omega t+\phi(t)]$$

The two phase shifter circuits 41 and 41' are the same except for the values of their circuit constants, and corresponding circuit elements of the two bear the same reference characters except for primes in the case of the circuit 41'.

Circuit 41 includes a tube 40 to whose grid is applied the modulating signal. Its plate resistor 35 and cathode resistor 32 have the same value. Consequently the signals taken from the plate and cathode have the same amplitude but opposite signs. The plate is connected to the cathode through a series circuit comprising condenser 34, resistor 35 and a paralrlel combination of condenser 36 and resistor 37. A parallel circuit comprising condenser 38 and resistor 39 is connected across the series of combination of resistor 32 and elements 36 and 37 in parallel.

If $C_{34}$, $C_{36}$ and $C_{38}$ represent the capacities of condensers 34, 36 and 38 and if $R_{35}$, $R_{37}$ and $R_{39}$ represent the values of resistors 35, 37 and 39, these values are so chosen that the 3 RC circuits 34—35, 36—37, 38—39 possess the same time constant, i.e.:

$$C_{34}R_{35}=C_{36}R_{37}=C_{38}R_{39}=\frac{1}{2\pi f_1} \qquad (7)$$

Moreover $$C_{36}=\frac{1}{s+2}C_{34}$$

$$R_{37}=(s+2)R_{35}$$

$$C_{38}=\frac{4}{s^2-4}C_{34}$$

$$R_{39}=\frac{s^2-4}{4}R_{35}$$

Consequently $$C_{38}=\frac{4}{s-2}C_{36}$$

$$R_{39}=\frac{s-2}{4}R_{37}$$

$s$ being a quantity which will be defined presently.

If $C_{34}'$, $C_{36}'$, $C_{38}'$ represent the capacities of the condensers 34', 36' and 38' and if $R_{35}'$, $R_{37}'$, $R_{39}'$ represent the values of the resistors 35', 37', 39', then these resistors and condensers are so chosen that the three circuits 34'—35', 36'—37', 38'—39' possess the same time constant:

$$C_{34}'R_{35}'=C_{36}'R_{37}'=C_{38}'R_{39}'=\frac{1}{2\pi f_2} \qquad (8)$$

Moreover the C' and R' values are inter-related by the same relations as exist between the C's and R's. Lastly if there is imposed the condition $$\sqrt{\frac{f_2}{f_1}}-\sqrt{\frac{f_1}{f_2}}=\frac{s}{1+\sqrt{2}} \qquad (9)$$

and if $$F_r=\frac{F}{\sqrt{f_1 f_2}} \qquad (10)$$

i.e. if the frequencies F are expressed in relative values $F_r$ by taking $\sqrt{f_1 f_2}$ as the unit of frequency, and if $\phi_1$ and $\phi_2$ are the phase changes introduced by the circuits 41 and 41', it can be shown that $$\cot\left(\frac{\phi_1}{2}-\frac{\phi_2}{2}\right)-1=\frac{(F_r-1)^2\left[F_r^2-\left(\frac{s^2}{1+\sqrt{2}}-2\right)F_r+1\right]}{\frac{s^2}{1+\sqrt{2}}F_r(1+F_r^2)} \qquad (11)$$

Figure 6:
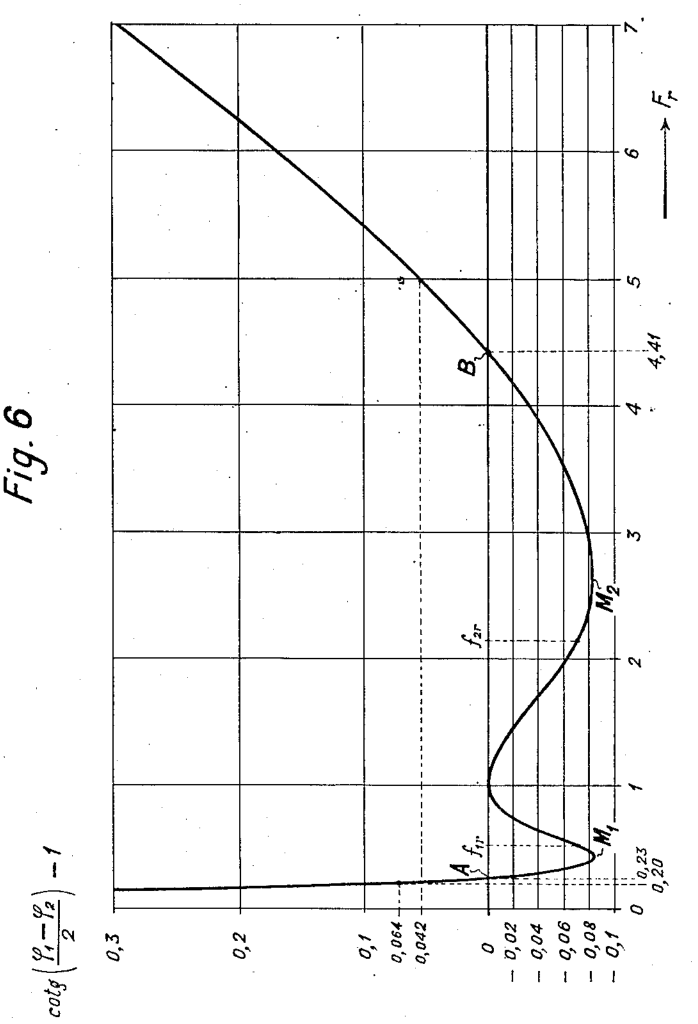
FIG. 6 is a graph useful in explaining the operation of the modulator of FIG. 5.

Equation 11 represents a family of curves which are functions of the relative frequency $F_r$ dependent on the parameter $s$. These curves are tangent to the axis of $F_r$ at the abscissa unity and intersect this axis at two points A and B whose abscissae are roots of the equation obtained by setting equal to zero the trinomial expression of the second degree which appears in the numerator of Equation 11. Each of these curves includes two minima $M_1$ and $M_2$. In order to obtain the least values for these two minima and the maximum spacing between the two points of intersection A and B, $s$ should be chosen near to or equal to 4. The curve of FIG. 6 has been plotted for $s=4$.

If as has been assumed the modulating signal is a telephonic signal falling between $F_1=140$ c.p.s. and $F_2=3500$ c.p.s., the unit of relative frequency may be chosen as $\sqrt{F_1F_2}=\sqrt{f_1f_2}=700$ c.p.s. In terms of the relative frequency, the limits of the speech channel are $$F_{1_r}=0.2 \text{ and } F_{2_r}=5$$

With $s=4$, Equation 9 gives $$f_1=329 \text{ c.p.s., or } f_{1_r}=0.47$$
$$f_2=1488 \text{ c.p.s., or } f_{2_r}=2.12$$

From assumed values for the resistance and capacity of any one of the circuits 34—35, 36—37, 38—39 and of any one of the circuits 34'—35', 36'—37' and 38'—39', the values of $f_1$, $f_2$ and $s$ permit determination of the resistance and capacity values in the others of these circuits. In the example above given:

| | |
|---|---|
| $R_{32}=R_{33}=3{,}000$ ohms | $R'_{32}=R'_{33}=3{,}000$ ohms |
| $C_{34}=24{,}000$ pF | $C'_{34}=5{,}350$ pF |
| $R_{35}=20{,}000$ ohms | $R'_{35}=20{,}000$ ohms |
| $C_{36}=4{,}030$ pF | $C'_{36}=892$ pF |
| $R_{37}=120{,}000$ ohms | $R'_{37}=120{,}000$ ohms |
| $C_{38}=8{,}060$ pF | $C'_{38}=1{,}785$ pF |
| $R_{39}=60{,}000$ ohms | $R'_{39}=60{,}000$ ohms |

The time constants defined by the Equations 7 and 8 are 480 $\mu$s for the circuit 41 and 107 $\mu$s for the circuit 41', i.e. that of the circuit 41 is approximately four times as great as that of the circuit 41'.

While the invention has been described hereinabove in terms of a preferred embodiment, various changes and modifications may be made therein without departing from the scope of the invention itself, which is set forth in the accompanying claims.

We claim:

1. A telephonic transmission system employing a channel some tens of cycles per second wide, said system comprising means for modulating a carrier wave of given frequency with a telephonic signal to obtain a single-sideband modulated signal without carrier, means to limit the amplitude of said single-sideband modulated signal, means to divide the frequency of the signal so limited by a given factor means to transmit to a receiving station the signal so divided in frequency, means to multiply in frequency by said factor the signal so transmitted as received at the receiving station, and means to convert the frequency of the signal so multiplied in frequency by mixing it with a wave of the same frequency as that of said carrier wave, whereby the telephonic signal of constant amplitude resulting from said frequency conversion includes the intelligence contained in the telephonic signal modulated on said carrier except for variations in amplitude.

2. A telephonic transmission system comprising means for modulating a carrier wave of given frequency with a telephonic signal to obtain from said carrier a single-sideband modulated signal without carrier, means to limit the amplitude of said single-sideband modulated signal, means to divide the frequency of the signal so limited by a given factor, means to transmit to a receiving station the signal so divided in frequency, means at said receiving station to multiply in frequency by said factor the signal so transmitted, and means to convert the frequency of the signal so multiplied in frequency by mixing it with a wave of the same frequency as that of said carrier wave.

3. A telephonic transmission system employing a channel some thirty cycles per second wide, said system comprising means at a transmitting station for modulating a carrier wave of given frequency with a telephonic signal to obtain a single-sideband modulated signal without carrier, means to limit the amplitude of said single-sideband modulated signal, means to divide the frequency of the signal so limited by a factor of the order of one hundred, means to transmit to a receiving station the signal so divided in frequency, means at said receiving station to multiply in frequency by said factor the signal so transmitted as received at the receiving station, and means to convert the frequency of the signal so multiplied in frequency by mixing it with a wave of the same frequency as that of said carrier wave, whereby the telephonic signal of constant amplitude resulting from said frequency conversion includes the intelligence contained in the telephonic signal modulated on said carrier except for variations in amplitude.

4. A telephonic transmission system comprising means at a transmitting station for modulating a carrier wave with a telephonic signal to obtain a single-sideband modulated signal without carrier, means to limit the amplitude of said single-sideband modulated signal, means to divide the frequency of the signal so limited, means to transmit to a receiving station the signal so divided in frequency, means at said receiving station to multiply the frequency of said last-named signal, and means to convert the frequency of the signal so multiplied in frequency by mixing it with a wave of the same frequency as that of said carrier wave, whereby the telephonic signal of constant amplitude resulting from said frequency conversion includes the intelligence contained in the telephonic signal modulated on said carrier except for variations in amplitude.

5. A narrow-band telephone transmitter comprising means for translating the range of frequencies in a variable amplitude speech signal to a like range of higher frequencies having corresponding amplitude variations, means for amplitude-limiting said range of higher frequencies to substantially eliminate the amplitude variations therein, and means for frequency dividing the said amplitude-limited range of higher frequencies by a predetermined factor to provide a constant amplitude transmitter output signal having a range of frequencies which is reduced with respect to the range of frequencies present in said speech signal.

6. A narrow band telephonic transmission system comprising means for amplitude modulating a carrier wave of given frequency with a telephonic signal to obtain a single-sideband signal without carrier, means for limiting the amplitude of said single-sideband signal to eliminate substantially all amplitude variations therein, means for doubling the frequency of said amplitude-limited single-sideband signal, means for dividing by twice a predetermined factor the frequency of the signal so doubled in frequency, means for transmitting to a receiving station the signal so divided in frequency, means at said receiving station for multiplying in frequency by said factor the signal frequencies received, and means for mixing the received signal frequencies so multiplied in frequency with a signal of the same frequency as said carrier wave.

References Cited in the file of this patent

UNITED STATES PATENTS

| | | |
|---|---|---|
| 1,666,206 | Hartley | Apr. 17, 1928 |
| 1,747,160 | Carpe | Feb. 18, 1930 |
| 2,117,739 | Miller | May 17, 1938 |
| 2,176,526 | Friend | Oct. 17, 1939 |
| 2,220,689 | Shore | Nov. 5, 1940 |
| 2,246,184 | Peterson | June 17, 1941 |
| 2,309,705 | Miller | Feb. 2, 1943 |
| 2,340,364 | Bedford | Feb. 1, 1944 |
| 2,599,964 | Woodbury | June 10, 1952 |
| 2,660,708 | Nakken | Nov. 24, 1953 |
| 2,761,105 | Crosby | Aug. 28, 1956 |
| 2,874,222 | De Jager | Feb. 17, 1959 |

UNITED STATES PATENT OFFICE

CERTIFICATE OF CORRECTION

Patent No. 2,998,491 August 29, 1961

Pierre C. Marcou et al.

It is hereby certified that error appears in the above numbered patent requiring correction and that the said Letters Patent should read as corrected below.

Column 7, lines 35, 52 and 66, and column 8, line 14, before "modulating", each occurrence, insert -- amplitude --.

Signed and sealed this 9th day of January 1962.

(SEAL)
Attest:

ERNEST W. SWIDER
Attesting Officer

DAVID L. LADD
Commissioner of Patents